United States Patent
Chien et al.

(10) Patent No.: US 8,018,218 B2
(45) Date of Patent: Sep. 13, 2011

(54) CONTROLLER OF DC-DC CONVERTER WITH INPUT VOLTAGE AND OUTPUT VOLTAGE SENSING FROM THE PHASE NODE

(75) Inventors: Min Chu Chien, Hsinchu (TW); Yung-Peng Huang, Taipei (TW)

(73) Assignee: uPI Semiconductor Corporation, Hsinchu County (TW)

( * ) Notice: Subject to any disclaimer, the term of this patent is extended or adjusted under 35 U.S.C. 154(b) by 776 days.

(21) Appl. No.: 12/129,056

(22) Filed: May 29, 2008

(65) Prior Publication Data

US 2009/0121696 A1    May 14, 2009

Related U.S. Application Data

(60) Provisional application No. 60/987,002, filed on Nov. 9, 2007.

(51) Int. Cl.
*G05F 5/00* (2006.01)

(52) U.S. Cl. .................. 323/299; 323/286; 323/271

(58) Field of Classification Search .................. 323/299, 323/311, 323, 282, 283, 285, 286, 271; 363/16
See application file for complete search history.

(56) References Cited

U.S. PATENT DOCUMENTS

| | | | | |
|---|---|---|---|---|
| 6,166,526 A | * | 12/2000 | Greitschus | 323/222 |
| 6,870,354 B2 | * | 3/2005 | Nishimaki | 323/284 |
| 7,199,563 B2 | * | 4/2007 | Ikezawa | 323/266 |

OTHER PUBLICATIONS

Intersil Data Sheet for ISL6236A—Mar. 14, 2007.

\* cited by examiner

*Primary Examiner* — Harry Behm
(74) *Attorney, Agent, or Firm* — Wang Law Firm, Inc.; Li K. Wang

(57) ABSTRACT

A PWM controller of a DC-DC converter is provided. The DC-DC converter converts an input voltage into an output voltage and comprises an output inductor coupled between an output of the DC-DC converter and a phase node. A first sense circuit senses a signal from the phase node to generate a first signal corresponding to the input voltage. A second sense circuit senses the signal from the phase node to generate a second signal corresponding to the output voltage. A PWM generator controls a first transistor and a second transistor of the DC-DC converter according to the first and second signals. The first transistor is coupled between the input voltage and the phase node, and the second transistor is coupled between the phase node and a ground.

17 Claims, 3 Drawing Sheets

US 8,018,218 B2

CONTROLLER OF DC-DC CONVERTER WITH INPUT VOLTAGE AND OUTPUT VOLTAGE SENSING FROM THE PHASE NODE

CROSS REFERENCE TO RELATED APPLICATIONS

This application claims the benefit of U.S. Provisional Application Ser. No. 60/987,002, filed Nov. 9, 2007, the entirety of which is incorporated by reference herein.

BACKGROUND OF THE INVENTION

1. Field of the Invention

The invention relates to a controller of a DC-DC converter, and more particularly to a switching mode controller of a bulk converter.

2. Description of the Related Art

DC-DC converters have been widely used for power supply circuits. FIG. 1 shows a conventional power supply controller of a DC-DC converter. The DC-DC converter is used to convert an input direct-current (DC) voltage $V_{in}$ into an output DC voltage $V_{out}$, wherein a voltage of the output voltage $V_{out}$ is smaller than that of the input voltage $V_{in}$. The power supply controller is a switching mode controller such as a pulse width modulation (PWM) controller, and is implemented in an integrated circuit (IC) 110. The IC 110 comprises a PWM controller 120 and five pins 130, 132, 134, 136 and 138. The PWM controller 120 receives the input voltage $V_{in}$ and the output voltage $V_{out}$ via the pins 130 and 138, respectively. According to the input voltage $V_{in}$ and the output voltage $V_{out}$, the PWM controller 120 generates two PWM signals $S_1$ and $S_2$ to control the transistors MU and ML through the pins 132 and 136, respectively. The transistor MU is coupled between the input voltage $V_{in}$ and the pin 134, and has a gate coupled to the pin 132 for receiving the PWM signal $S_1$. The transistor ML is coupled between the pin 134 and a ground GND, and has a gate coupled to the pin 136 for receiving the PWM signal $S_2$.

Furthermore, an output inductor L is coupled between the pin 134 and an output of the DC-DC converter. In order to obtain a desired voltage value of the output voltage $V_{out}$, the PWM controller 120 receives the input voltage $V_{in}$, a signal from the output inductor L and the output voltage $V_{out}$ via the pins 130, 134 and 138 of the IC 110 respectively, and then controls the PWM signals $S_1$ and $S_2$ according to the received signals to switch the transistors MU and ML.

BRIEF SUMMARY OF THE INVENTION

A PWM controller, DC-DC converter and controlling method thereof are provided. An exemplary embodiment of such a PWM controller of a DC-DC converter is provided, wherein the DC-DC converter converts an input voltage into an output voltage and comprises an output inductor coupled between an output of the DC-DC converter and a phase node. The PWM controller comprises a first sense circuit for sensing a signal from the phase node to generate a first signal corresponding to the input voltage, a second sense circuit for sensing the signal from the phase node to generate a second signal corresponding to the output voltage, and a PWM generator for controlling a first transistor, and a second transistor of the DC-DC converter according to the first and second signals. The first transistor of the DC-DC converter is coupled between the input voltage and the phase node, and the second transistor of the DC-DC converter is coupled between the phase node and a ground. The first sense circuit senses the signal from the phase node when the first transistor is turned on.

Furthermore, an exemplary embodiment of a DC-DC converter for converting an input voltage into an output voltage is provided. The DC-DC converter comprises an input node for receiving the input voltage, an output node for outputting the output voltage, an output inductor coupled between the output node and a phase node, a first transistor coupled between the input node and the phase node, a second transistor coupled between a ground and the phase node and a PWM controller. The PWM controller comprises a first sense circuit for sensing a signal from the phase node when the first transistor is turned on to generate a first signal corresponding to the input voltage, a second sense circuit for sensing the signal from the phase node to generate a second signal corresponding to the output voltage, and a PWM generator for receiving the first and second signals and switching the first and second transistors according to the first and second signals.

Moreover, a controlling method for a DC-DC converter is provided, wherein the DC-DC converter converts an input voltage into an output voltage and comprises an output inductor coupled between an output of the DC-DC converter and a phase node. A signal from the phase node is sensed to generate a first signal corresponding to the input voltage and a second signal corresponding to the output voltage. At least a PWM signal is generated according to the first and second signals. A first transistor and a second transistor of the DC-DC converter are switched according to the PWM signal. The first transistor of the DC-DC converter is coupled between the input voltage and the phase node, and the second transistor of the DC-DC converter is coupled between the phase node and a ground.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2A:
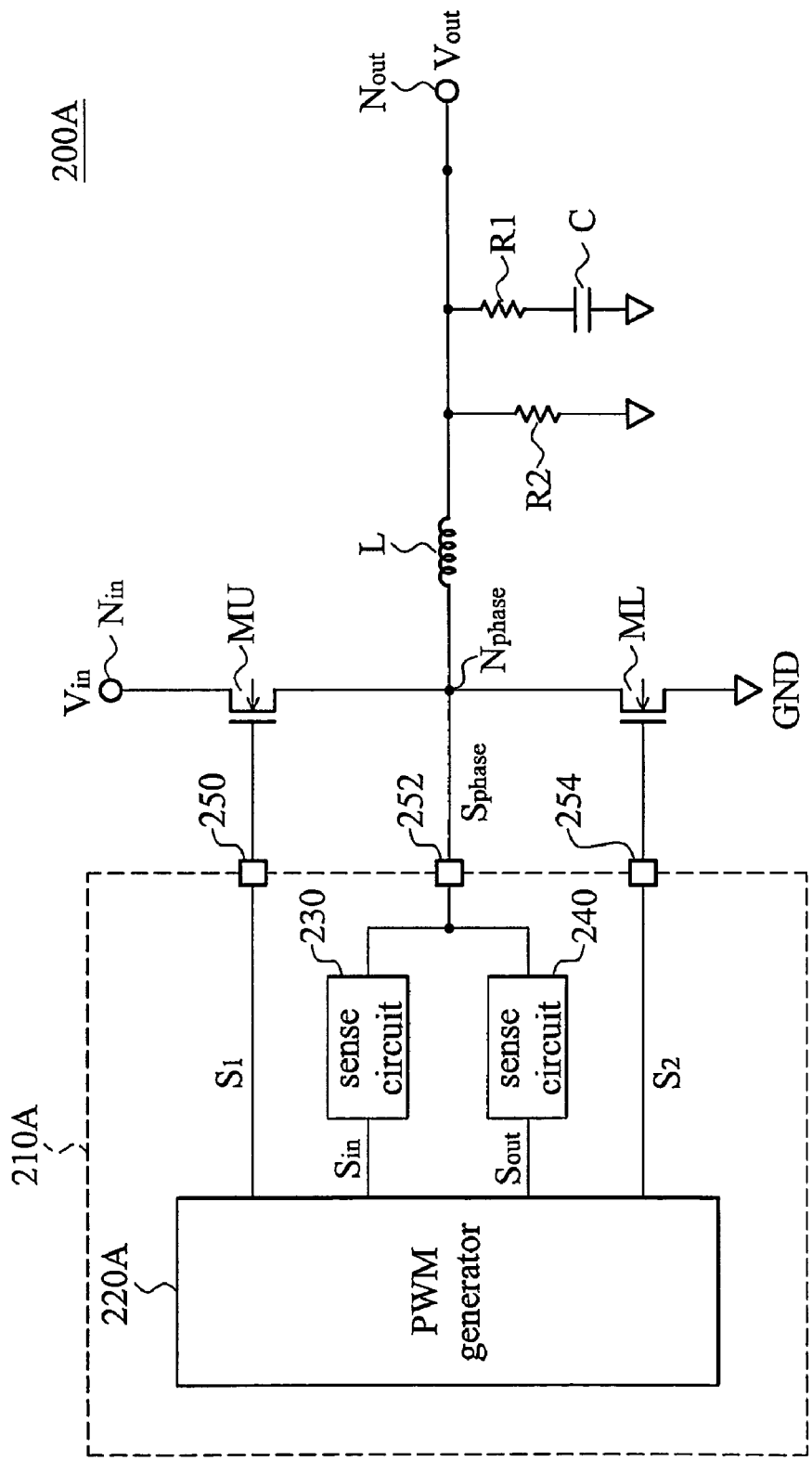
FIG. 2A shows a PWM controller of a DC-DC converter according to an embodiment of the invention.

FIG. 2A shows a PWM controller of a DC-DC converter 200A according to an embodiment of the invention. The PWM controller is implemented in an IC 210A and is used to convert an input voltage $V_{in}$ received from an input node $N_{in}$ into an output voltage $V_{out}$. In this embodiment, the DC-DC converter 200 is a bulk converter so a voltage of the output voltage $V_{out}$ is smaller than that of the input voltage $V_{in}$. The DC-DC converter 200A further comprises two transistors MU and ML, an output inductor L, a capacitor C and two resistors R1 and R2, wherein the capacitor C and two resistors R1 and R2 form a low pass filter (LPF) to filter the output voltage $V_{out}$. The transistor MU is coupled between the input node $N_{in}$ and a phase node $N_{phase}$, and the transistor ML is coupled between the phase node $N_{phase}$ and a ground GND. In this embodiment, the transistors MU and ML are N-type transistors, and the drivers of the transistors MU and ML are not illustrated herein to simplify the descriptions. The output inductor L is coupled between the phase node $N_{phase}$ and an output node $N_{out}$, wherein the output voltage $V_{out}$ is outputted at the output node $N_{out}$.

As shown in FIG. 2A, the IC 210A comprises a PWM generator 220A, two sense circuits 230 and 240, and three pins 250, 252 and 254. The PWM generator 220A generates two PWM signals $S_1$ and $S_2$ to control the transistors MU and ML via the pins 250 and 254, respectively. It is to be noted that the PWM signals $S_1$ and $S_2$ are unable to simultaneously turn on the transistors MU and ML. The sense circuit 230 senses a signal $S_{phase}$ from the phase node $N_{phase}$ to generate a signal $S_{in}$, and transmits the signal $S_{in}$ to the PWM generator 220A, wherein the signal $S_{phase}$ is a current or voltage signal at the signal $S_{phase}$. In this embodiment, the sense circuit 230 comprises a sample and hold circuit, wherein the sample and hold circuit samples the signal $S_{phase}$ from the phase node $N_{phase}$ when the transistor MU is turned on. After the sampling and holding step is completed, the sense circuit 230 provides the signal $S_{in}$ to the PWM generator 220A, wherein the signal $S_{in}$ may be a current or voltage signal. Moreover, the signal $S_{in}$ corresponds to the input voltage $V_{in}$ because the input voltage $V_{in}$ is transmitted to the phase node $N_{phase}$ when the transistor MU is turned on.

Meanwhile, the sense circuit 240 also senses the signal $S_{phase}$ from the phase node $N_{phase}$ to generate a signal $S_{out}$, and transmits the signal $S_{out}$ to the PWM generator 220A. In this embodiment, the sense circuit 240 comprises a low pass filter (LPF), wherein the LPF filters the signal $S_{phase}$ when the DC-DC converter 200 is operating. After the LPF filters the signal $S_{phase}$, the sense circuit 240 provides the signal $S_{out}$ to the PWM generator 220A, wherein the signal $S_{out}$ is a current or voltage signal corresponding to the output voltage $V_{out}$. Thus, the PWM generator 220A can generate and control the PWM signals $S_1$ and $S_2$ to switch the transistors MU and ML according to the signals $S_{in}$ and $S_{out}$.

Figure 1:
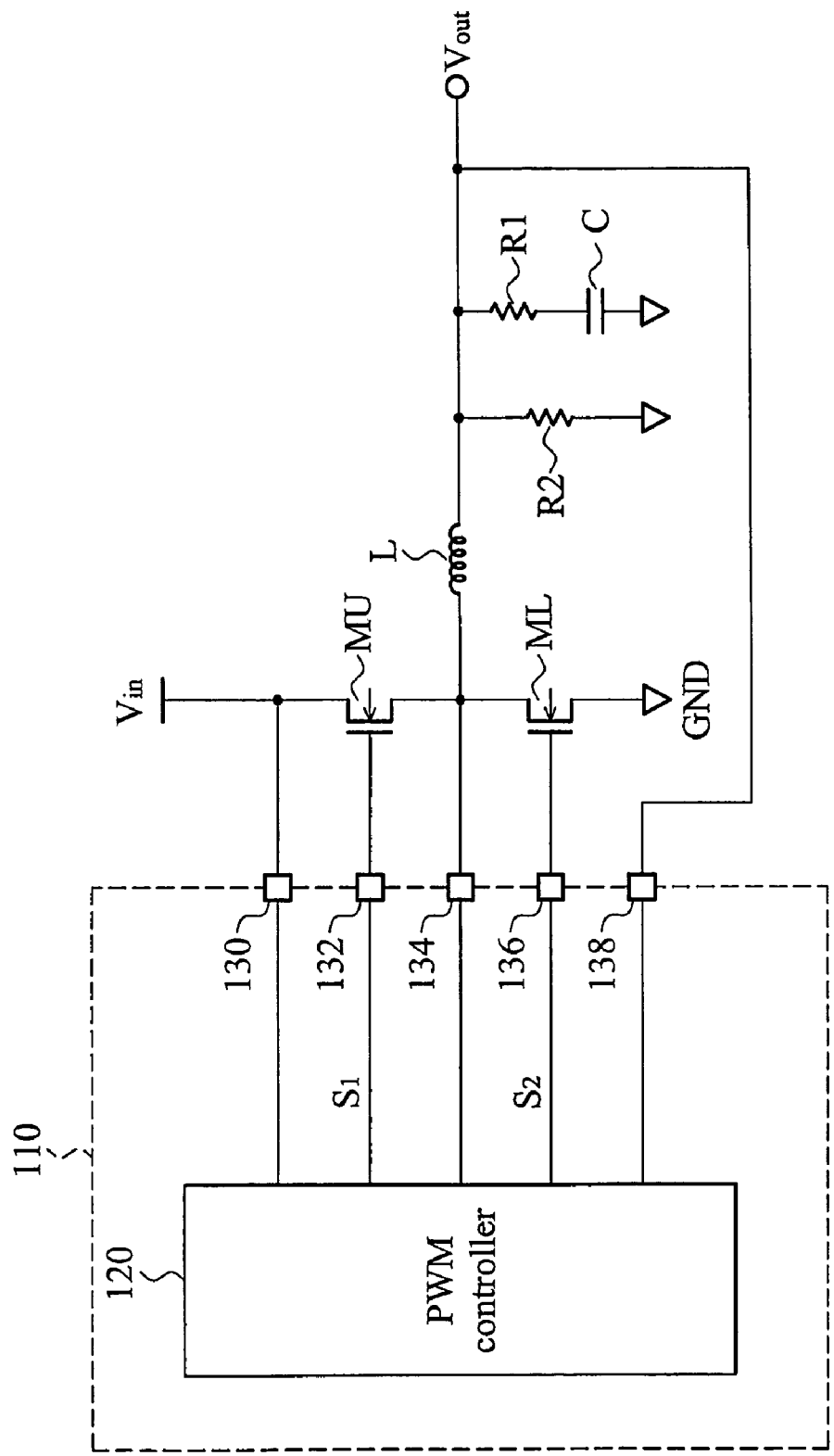
FIG. 1 shows a conventional power supply controller of a DC-DC converter.

Referring to FIG. 2A, the PWM controller is implemented in the IC 210A. In this embodiment, the IC 210A does not need any pins to receive the input voltage $V_{in}$ and the output voltage $V_{out}$. Therefore, the pins 130 and 138 shown in FIG. 1 do not exist in the IC 210A, thus reducing the amount of pins and the chip area of the IC 210A.

Figure 2B:
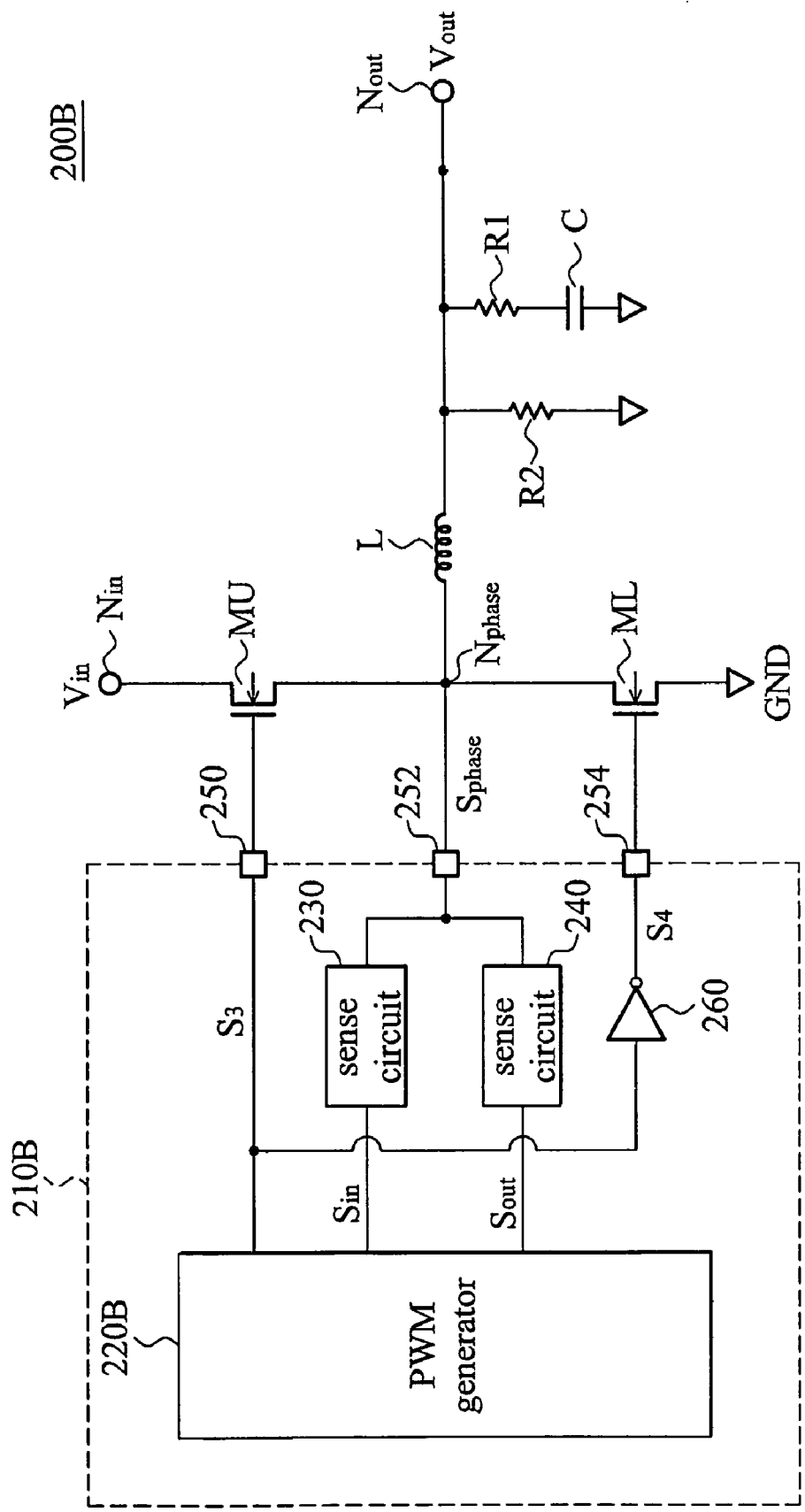
FIG. 2B shows a PWM controller of a DC-DC converter according to another embodiment of the invention.

FIG. 2B shows a PWM controller of a DC-DC converter 200B according to another embodiment of the invention. The PWM controller is implemented in an IC 210B. Similarly, the IC 210B also comprises the pin 250 coupled to the transistor MU, the pin 252 coupled to the phase node $N_{phase}$ and the pin 254 coupled to the transistor ML. In this embodiment, a PWM generator 220B generates a PWM signal $S_3$ to control the transistor MU via the pin 250. In addition, the PWM generator 220B also transmits the PWM signal $S_3$ to an inverter 260, and then the inverter 260 generates a PWM signal $S_4$ to control the transistor ML via the pin 254, wherein the PWM signal $S_4$ is substantially inverted with respect to the PWM signal $S_3$. Hence, the PWM generator 220B is unable to simultaneously turn on the transistors MU and ML. In one embodiment, the transistors MU and ML can be implemented in the IC 210B, which has an additional pin to receive the input voltage $V_{in}$. Furthermore, the IC 210B has no pin to receive the output voltage $V_{out}$.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A PWM controller for a DC-DC converter, wherein the DC-DC converter converts an input voltage into an output voltage and comprises an output inductor coupled between an output of the DC-DC converter and a phase node, comprising:
   a first sense circuit for sensing a signal from the phase node to generate a first signal corresponding to the input voltage;
   a second sense circuit for sensing the signal from the phase node to generate a second signal corresponding to the output voltage; and
   a PWM generator for controlling a first transistor and a second transistor of the DC-DC converter according to the first and second signals,
   wherein the first transistor of the DC-DC converter is coupled between the input voltage and the phase node, and the second transistor of the DC-DC converter is coupled between the phase node and a ground, and
   wherein the first sense circuit senses the signal from the phase node when the first transistor is turned on.

2. The PWM controller as claimed in claim 1, wherein the first sense circuit comprises a sample and hold circuit for sampling the signal from the phase node when the first transistor is turned on.

3. The PWM controller as claimed in claim 1, wherein the second sense circuit comprises a low pass filter for filtering the signal from the phase node.

4. The PWM controller as claimed in claim 1, wherein the first sense circuit, the second sense circuit and the PWM generator are implemented in an integrated circuit without the pins for receiving the input or output voltages.

5. The PWM controller as claimed in claim 1, wherein the PWM generator is unable to simultaneously turn on the first and second transistors of the DC-DC converter.

6. A DC-DC converter for converting an input voltage into an output voltage, comprising:
   an input node for receiving the input voltage;
   an output node for outputting the output voltage;
   an output inductor coupled between the output node and a phase node;
   a first transistor coupled between the input node and the phase node;
   a second transistor coupled between a ground and the phase node; and
   a PWM controller, comprising:
      a first sense circuit for sensing a signal from the phase node when the first transistor is turned on to generate a first signal corresponding to the input voltage;
      a second sense circuit for sensing the signal from the phase node to generate a second signal corresponding to the output voltage; and
      a PWM generator for receiving the first and second signals and switching the first and second transistors according to the first and second signals.

7. The DC-DC converter as claimed in claim 6, wherein the first sense circuit comprises a sample and hold circuit for sampling the signal from the phase node when the first transistor is turned on.

8. The DC-DC converter as claimed in claim 6, wherein the second sense circuit comprises a low pass filter for filtering the signal from the phase node.

9. The DC-DC converter as claimed in claim 6, wherein the DC-DC converter is a bulk converter.

10. The DC-DC converter as claimed in claim 6, wherein the PWM controller is implemented in an integrated circuit without the pins for receiving the input or output voltages.

11. The DC-DC converter as claimed in claim 6, wherein the first and second transistors and the PWM controller are implemented in an integrated circuit without a pin for receiving the output voltage.

12. The DC-DC converter as claimed in claim 6, wherein the PWM generator is unable to simultaneously turn on the first and second transistors.

13. A controlling method for a DC-DC converter, wherein the DC-DC converter converts an input voltage into an output voltage and comprises an output inductor coupled between an output of the DC-DC converter and a phase node, comprising:
    sensing a signal from the phase node to generate a first signal corresponding to the input voltage and a second signal corresponding to the output voltage;
    generating at least a PWM signal according to the first and second signals; and
    switching a first transistor and a second transistor of the DC-DC converter according to the PWM signal, wherein the first transistor of the DC-DC converter is coupled between the input voltage and the phase node, and the second transistor of the DC-DC converter is coupled between the phase node and a ground.

14. The controlling method as claimed in claim 13, wherein sensing the signal from the phase node further comprises:
    sensing the signal from the phase node when the first transistor of the DC-DC converter is turned on to generate the first signal.

15. The controlling method as claimed in claim 14, wherein sensing the signal from the phase node further comprises:
    sampling and holding the signal from the phase node when the first transistor of the DC-DC converter is turned on to generate the first signal.

16. The controlling method as claimed in claim 13, wherein sensing the signal from the phase node further comprises:
    filtering the signal from the phase node to generate the second signal.

17. The controlling method as claimed in claim 13, wherein the DC-DC converter is a bulk converter.

* * * * *